United States Patent [19]

Fenneman

[11] 4,042,892
[45] Aug. 16, 1977

[54] HYPERSONIC GAS LASER

[75] Inventor: David B. Fenneman, Ridgecrest, Calif.

[73] Assignee: The United States of America as represented by the Secretary of the Navy, Washington, D.C.

[21] Appl. No.: 707,806

[22] Filed: July 22, 1976

[51] Int. Cl.² .............................................. H01S 3/00
[52] U.S. Cl. ........................ 331/94.5 G; 331/94.5 C; 331/94.5 D; 331/94.5 P
[58] Field of Search ...................... 331/94.5 G, 94.5 C, 331/94.5 D, 94.5 P, 94.5 E; 330/4.3

[56] References Cited

U.S. PATENT DOCUMENTS

| 3,571,747 | 3/1971 | Bronfin | 331/94.5 |
| 3,605,038 | 9/1971 | Byrne | 331/94.5 |
| 3,758,876 | 9/1973 | Klement | 331/94.5 |
| 3,760,294 | 9/1973 | Roberts | 331/94.5 |
| 3,811,095 | 5/1974 | Rich | 331/94.5 |
| 3,984,784 | 10/1976 | Pimpley | 331/94.5 G |
| 4,011,521 | 3/1977 | Kantrowitz | 331/94.5 G |

OTHER PUBLICATIONS

Gerry, S.P.I.E. Journal, vol. 9, Jan. 1971, pp. 61–70.
Yatsiv, et al., Pulsed CO₂ Gas Dynamic Laser, Appl. Phys. Lett., vol. 19, No. 3, Aug. 71, p. 65, et. seq.
Bershader et al., Proc. 9th Int. Shock Tube Symp., Stanford Univ. Press, 1973, p. 184 et seq.

Primary Examiner—Martin H. Edlow
Attorney, Agent, or Firm—R. S. Sciascia; Roy Miller; Thomas W. Hennen

[57] ABSTRACT

A hypersonic gas laser to produce coherent infra-red electromagnetic radiation for use in communication, illumination, energy transmission or weather control. The lasing device uses an interaction area consisting of a grid of fine wires or the like to convert the kinetic energy of hypersonic velocity gases to vibrationally excited nitrogen from which the laser energy is extracted.

5 Claims, 4 Drawing Figures

HYPERSONIC GAS LASER

BACKGROUND OF THE INVENTION

The present invention relates to gas lasers, and more particularly to a hypersonic gas laser which converts kinetic energy to vibrationally excited energy.

The most closely related lasing device is the so called gasdynamic laser as described by Dr. Edward T. Gerry in the *Society of Photo Optical Instrumentation Engineers Journal*, volume 9, pp 6170, January 1971. In a gasdynamic laser, lasing action is produced by a very rapid expansion of a hot gas mixture through supersonic (Mach numbers 1-5) nozzles. The $CO_2$ gasdynamic laser uses the rapid expansion to "freeze" vibrational energies in nitrogen molecules which subsequently get transferred to the upper lasing vibratory level of $CO_2$ molecules. This produces the inversion necessary for lasing action since the vibratory energy of the lower lasing $CO_2$ levels do not "freeze" during the rapid expansion, but is relaxed or depopulated to the level appropriate to local thermodynamic conditions.

The dynamics of this rapid expansion process puts very extreme design requirements on such devices. They require a large number of supersonic nozzles with very small throat widths which:

1. produce wakes in the laser cavity,
2. require very precise alignment,
3. limit their operating lifetime and/or lasing duration due to severe heat transfer characteristics, and
4. must be built to very close design tolerance with the attendant expense.

Besides the nozzle engineering requirement, the "quick freeze" concept limits the gas mixture to very small water percentages so that the water, besides depopulating the lower lasing levels during the expansion process (which is its function) does not also depopulate the upper lasing level of the $CO_2$ molecules. This has the result that combustion driven devices cannot use air and common hydrocarbon fuels, but rather must use mixtures of poisonous and noxious gases such as carbon monoxide, nitrous oxide, cyanogen, etc. the efficiency of the gasdynamic laser is on the order of 1.5%.

SUMMARY OF THE INVENTION

The present invention provides a hypersonic gas laser which relies on the concept of conversion of kinetic energy to vibratory energies. A mixture of hot gases expands through a single hypersonic nozzle to speeds of Mach number 5 or greater. The kinetic energy of the gas flow is converted to vibrational energy of nitrogen by collision with an array of wires in an interaction region after the expansion zone. After smoothing the gas flow, lasing action occurs as in the gasdynamic laser.

DESCRIPTION OF THE PREFERRED EMBODIMENT

Figure 1:
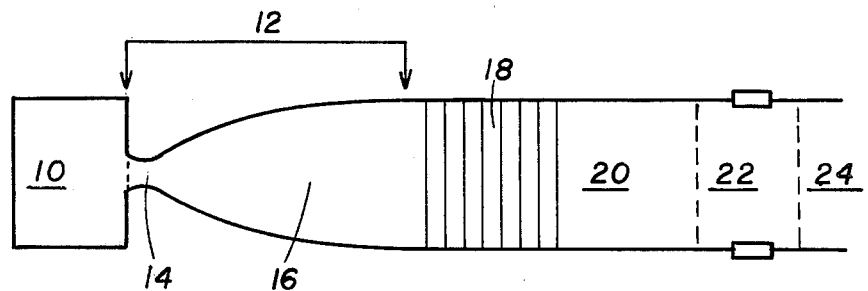
FIG. 1 is a schematic of a hypersonic gas laser.

Referring now to FIG. 1, a pressure chamber 10 in which a suitable mixture of gases, including nitrogen, carbon dioxide and water vapors, or helium, or some other appropriate gas to aid in the relation of the lower $CO_2$ lasing level, is heated to a high temperature has an exit through a hypersonic nozzle 12 having a throat 14 and an expansion region 16. Upon exiting the nozzle 12, the hot gas enters an interaction region 18 at hypersonic velocity (Mach number 5 or greater). The interaction region 18 has an array of fine wires or other mechanism which accomplished the conversion of kinetic energy to vibrational energy by, for example, high speed collision with the wires or subsequent high speed collision of a backwardly bouncing gas molecule (after it hits a wire) with a forwardly moving stream gas molecule. The wires may be made of any strong metal such as steel, tungsten, etc.

The crucial aspects which make the hypersonic laser operate occur in the interaction region 18. First, the gas stream kinetic energy per molecule must be greater than the vibrational energy quantum, this requires hypersonic flow. Secondly, the collision inducing wires must be of a radius less than the mean free path of the impinging gas molecules so no molecules are brought to rest near the wires to produce unwanted stagnations and shock waves. An thirdly, the individual wires are spaced on the order of 100-1000 mean free paths away from each other, and in a suitable fashion so that the thermodynamic changes wrought by the wires on the gas stream are gradual and incoherent.

The gas exits the interaction region 18 where the newly excited nitrogen is allowed to give up its energy to $CO_2$ molecules, and the flow is allowed to settle down in area 20. From there the gas enters a lasing region 22 where the laser energy is extracted. The spent gas enters the exit region 24 where it is exited or prepared for recirculation.

Figure 2A:
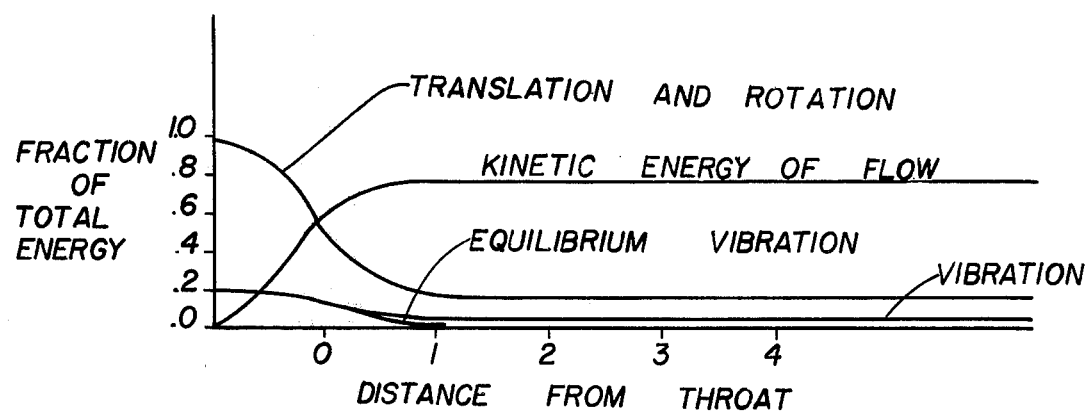
FIG. 2a is a graph showing the energy distribution along a hypersonic gas laser.
Figure 2B:
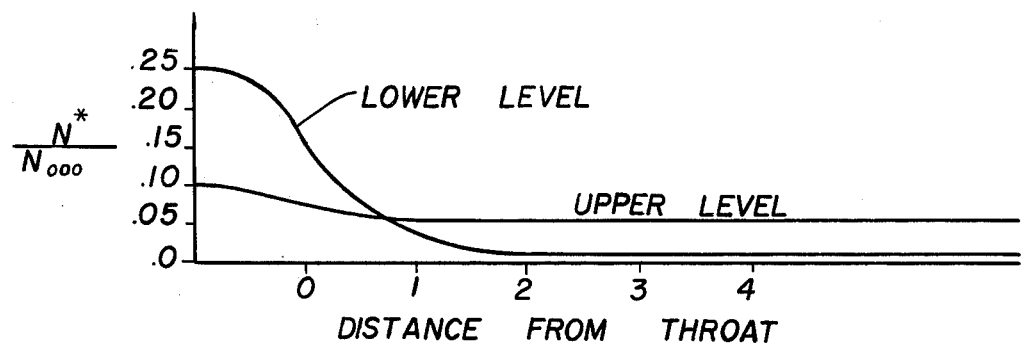
FIG. 2b is a graph showing the "freeze" of the vibrational energy in nitrogen which gets transferred to the upper lasing vibratory level of carbon dioxide molecules.
Figure 3:
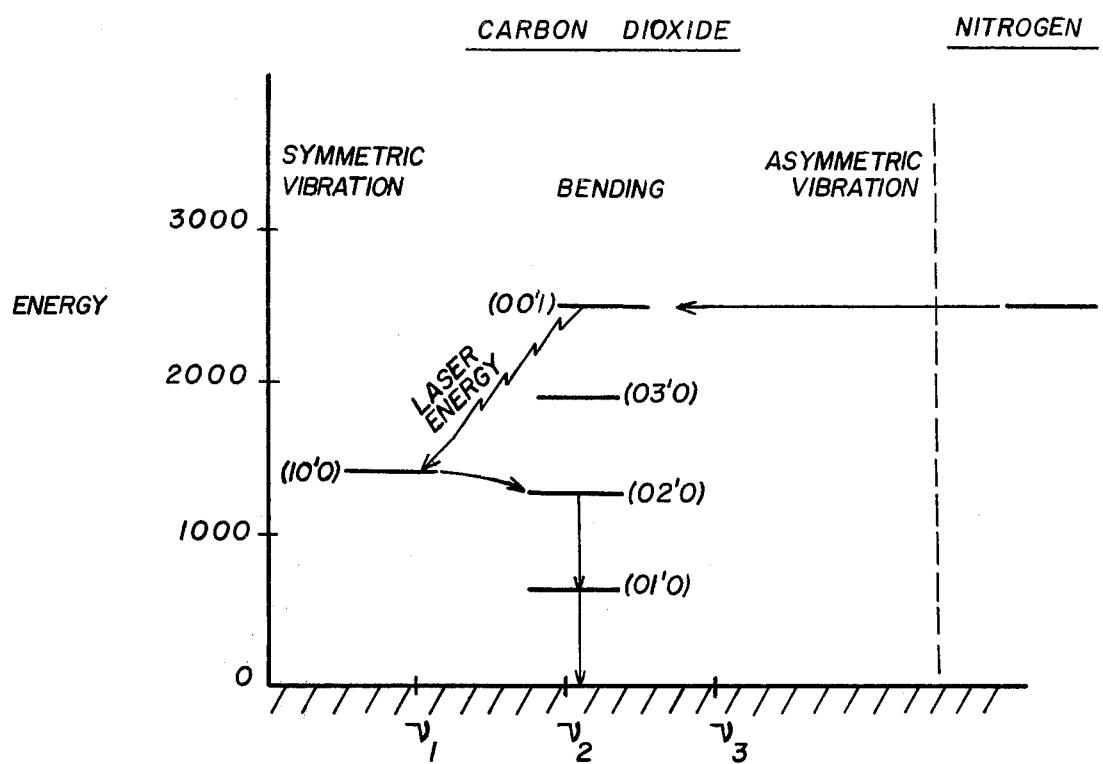
FIG. 3 is an energy level diagram of the carbon dioxide and nitrogen molecules.

FIG. 2a shows the distribution of the energy forms in the hypersonic gas laser. After the gas mixture is heated, the energy is primarily in the form of translational and rotational energy of the molecules with some vibrational energy. As the gas flows through the throat 14 of the nozzle 12, the molecules are accelerated to hypersonic speeds with resulting conversion of most of the thermal translational and rotational energy into kinetic energy of the gas flow, with the vibrational energy essentially "frozen" in the upper $CO_2$ level. The water, helium or other relaxing medium essentially depopulates the lower $CO_2$ level as shown in FIG. 2b. Thus, the energy after exiting the expansion region 16 of the nozzle 12 is predominately in the form of kinetic energy.

Part of this vast supply of kinetic energy of flow is converted to vibrational energy of nitrogen by the collisions in the interaction region 18. This energy is transferred to the upper level of the $CO_2$ molecules by ordinary molecular collisions before entering the lasing region 20. The laser transition is from the upper level assymetric stretch mode to the first symetric stretch mode.

Since the "quick freeze" mechanism is abandoned in favor of the translational-to-vibrational mechanism to supply vibrational energy to the nitrogen, the extreme design requirements for gasdynamic lasers are eliminated.

Thus, the hypersonic gas laser is easier to fabricate, is cheaper and is more reliable with longer operating life. Also, since the reservoir of energy for the vibrational excitation comes from all the degrees of freedom of the gas, the intrinsic efficiency of the hypersonic gas laser is from five to seven times higher than that of the gasdynamic laser. Finally, the depopulation of the upper levels of the $CO_2$ molecules by collisions with water during the expansion process is not important since the vibrational energy is created by collisions after leaving the expansion region and therefore, air and hydrocarbon fuels can be used for combustion driven devices rather than prior poisonous and noxious gases.

What is claimed is:

1. A hypersonic gas laser comprising:
   means for heating a suitable mixture of gases to a high temperature in a pressure chamber;
   a nozzle having a throat and an expansion region connected to said pressure chamber configured so that hot gases exiting said pressure chamber through said nozzle attain a hypersonic velocity;
   means in an interaction region adjacent said nozzle for converting the kinetic energy of said gases flowing at said hypersonic velocity into vibrational energy; and
   a lasing region adjacent said interaction region where said vibrationally energized gases emit optical radiation.

2. A hypersonic gas laser as recited in claim 1 wherein;
   said means for converting comprise a grid of fine wires with a radius less that the mean free path of the impinging molecules of said gases, said wires being spaced 100-1000 mean free paths away from each other.

3. A hypersonic gas laser as recited in claim 2 wherein;
   said suitable mixture of gases comprise nitrogen, carbon dioxide and a relaxing medium.

4. A hypersonic gas laser as recited in claim 3 wherein;
   said heating means comprises combusting air and a hydrocarbon fuel.

5. A hypersonic gas laser as recited in claim 4 wherein;
   said relaxing medium comprises a medium selected from the group consisting of water and helium.

* * * * *